(12) United States Patent
Ozkul et al.

(10) Patent No.: US 11,843,568 B1
(45) Date of Patent: Dec. 12, 2023

(54) PERSONALIZED COMMUNICATIONS MANAGEMENT

(71) Applicant: Amazon Technologies, Inc., Seattle, WA (US)

(72) Inventors: Olgu Ozkul, Champaign, IL (US); Srikanth Sridharan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/853,154

(22) Filed: Jun. 29, 2022

(51) Int. Cl.
*H04L 51/21* (2022.01)

(52) U.S. Cl.
CPC .................................. *H04L 51/21* (2022.05)

(58) Field of Classification Search
None
See application file for complete search history.

(56) References Cited

U.S. PATENT DOCUMENTS

| | | | |
|---|---|---|---|
| 8,799,765 B1* | 8/2014 | MacInnis | G06F 40/169 715/253 |
| 2005/0084082 A1* | 4/2005 | Horvitz | H04M 3/436 379/114.06 |
| 2010/0274661 A1* | 10/2010 | Aaltonen | G06Q 30/0267 705/14.42 |
| 2020/0034882 A1* | 1/2020 | Deng | G06Q 30/0244 |
| 2021/0027324 A1* | 1/2021 | Remy | G06Q 30/0244 |

* cited by examiner

*Primary Examiner* — James A Edwards
(74) *Attorney, Agent, or Firm* — Lee & Hayes, P.C.

(57) ABSTRACT

Technologies are disclosed for performing personalized communications management. Data can be identified, collected, and/or generated to manage communications between a communications management system and user devices. The data can include individualized data associated with devices and/or users of the devices. The communications management system can identify and/or select recipients of subsequent communications based on results collected from analysis of messages transmitted using the individualized data. Recipients for transmissions of subsequent communications can be continuously redefined.

20 Claims, 5 Drawing Sheets

PERSONALIZED COMMUNICATIONS MANAGEMENT

BACKGROUND

Communications management systems are undergoing growing demands for managing increasing quantities of communications. Devices of intended recipients of the messages, as well as communication channels utilized by the devices, are increasing in numbers and types. If communications are queued for transmission by the communications management systems, the communications may be transmitted based on times at which transmission requests for the communications are generated and/or identified. Management of the communications that is agnostic to priorities, characteristics, and/or preferences associated with the communications, the communications management system, and/or user devices may result in undesirable communication transmission and/or reception.

In some cases, constraints placed on the communications management systems, and/or on the devices communicatively coupled to the communications management systems, often results in delays and/or failures in processing the communications. Requirements of the communications management systems to transmit larger numbers of communications of certain types may result in an inability to timely and/or properly manage other types of communications. Requirements of the recipient devices to receive large numbers of communications may cause system malfunctions and/or increase system latency. Although some systems perform split testing and/or observational studies to estimate impacts of communications, such testing and/or studies often produce inaccurate and/or incomplete results.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
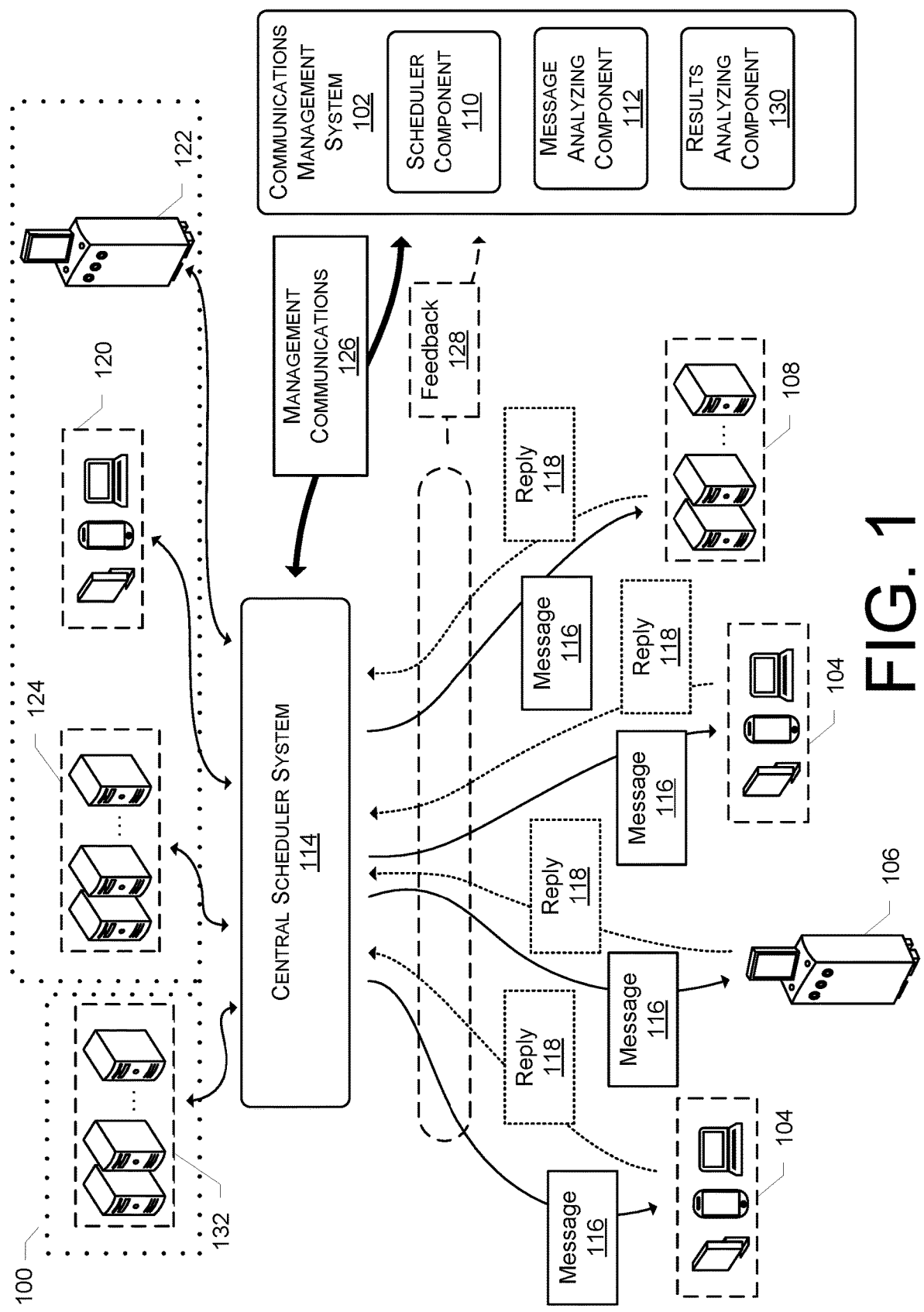
FIG. 1 is an illustrative environment for performing personalized communications management, in accordance with at least one embodiment.

This disclosure is directed to techniques for performing personalized communications management. The personalized communications management can be performed by a communications management system included in, and/or communicatively couple to, a central computing system. The communications management system can identify, collect, and/or generate data utilized to manage communications between the communications management system and user devices. The data can include individualized data associated with the user devices and/or the recipients of the communications, data associated with the communications, data associated with an entity associated with the recipients of the communications, and/or data associated with the communications management system. The communications management system can identify and/or select populations of the communications and utilize the identified and/or generated data to continuously redefine the populations. The identifying, selecting, and/or redefining of the populations can be performed iteratively to customize management of the communications, and/or to identify, collect, and/or generate additional data utilized to tailor subsequent communications between the communications management system and recipient target groups.

The communications management system can utilize various algorithms, including estimation algorithms such as causal forest model algorithms and/or decision tree-based model algorithms. The data utilized to manage the communications can be identified, collected, and/or generated based on the estimation algorithms. Results can be provided by the estimation algorithms based on analysis of data, which can include various types of data, such as communication data (e.g., communications priorities and/or characteristics), device data (e.g., device priorities and/or characteristics), communications management system data (e.g., system priorities and/or characteristics), operational characteristics (e.g., operational characteristics of devices, systems, and/or networks), service provider data (e.g., service provider priorities, characteristics, and/or preferences), and/or recipient data (e.g., recipient priorities, characteristics, demographics, and/or preferences).

The populations identified, defined, and/or selected to receive the communications can be subdivided into different groups utilized by the estimation algorithms. The different groups identified, defined, and/or selected by subdividing the populations can include a treatment group and a control group. The treatment group and the control group can be associated with one or more types of shared data (e.g., priority(ies), characteristic(s), and/or preference(s) in common) and one or more types of unshared data (e.g., priority(ies), characteristic(s), and/or preference(s) not in common). The treatment group can be a target group with individuals identified and/or selected to receive the communications. The control group, which can include other individuals that are different from the individuals of the treatment group, can be utilized as a baseline for determining a first efficacy level of communications transmitted to the control group. The treatment group can be identified, defined, and/or selected based on identifying and/or determining a probability that a second efficacy level of communications transmitted to the control group will be greater than or equal to a threshold efficacy level. The treatment group can be identified, defined, and/or selected based on the identified and/or determined probability being greater than or equal to a predefined probability (e.g., a threshold probability).

Furthermore, the techniques described herein provide various technical advantages for systems managing communications, devices with which the systems exchange the communications, and/or networks utilized to process, and/or control flows of, the communications exchanged between the systems and the devices. Various resources (e.g., compute resources, storage resources, etc.) of communications management systems can be optimized by decreasing (e.g., significantly and/or substantially decreasing) levels of communications being exchanged during various periods of time, and/or decreasing (e.g., significantly and/or substantially decreasing) overall levels of communication exchanges. By decreasing the levels of communications, demands on the resources of the communications management systems can be minimized, thereby freeing up the resources for other systems tasks and/or functions. Amounts and/or types of failures, malfunctions, and/or delays experienced by the communications management systems can also be decreased and/or eliminated (e.g., partially, or entirely eliminated).

With respect to the devices exchanging the communications with the communications management systems, device resources (e.g., compute resources, storage resources, etc.) that would otherwise be exhausted by utilizing techniques according to existing technology can be conserved. The conserved resources can be allocated for other device tasks and/or functions, thereby reducing latency of the devices, increasing resource availability, and/or minimizing device failures and malfunctions.

Moreover, the techniques described herein optimize network performance by decreasing (e.g., significantly and/or substantially decreasing) levels of communications passed through and/or controlled by networks utilized by the communications management systems and user devices. Network performance can be improved based on elimination of unnecessary communications, thereby conserving network bandwidth for other purposes and/or reducing network latency. In addition, a reduced amount of communications being transmitted across various networks also will prevent possible data packet loss (e.g., messages being transmitted but not received by an intended recipient). Network malfunctions and/or errors that may otherwise occur according to existing technology can be also avoided. As a result, other communications identified, selected, generated, and/or exchanged by the network based on the elimination of unnecessary communications can be more reliably controlled, effectively managed, and/or efficiently processed by the network.

The methods, apparatuses, and systems described herein can be implemented in a number of ways. References are made to the accompanying drawings that form a part hereof, and in which are shown by way of illustration specific configurations or examples, in which like numerals represent like elements throughout the several figures.

FIG. 1 is an illustrative environment 100 for performing personalized communications management, in accordance with at least one embodiment. In the environment 100, a communications management system 102 can be utilized to manage communications for one or more user devices 104, one or more messaging devices (or "custom devices") 106, and/or one or more systems (or "messaging systems") 108. The communications management system 102 can include a scheduler component 110 and a message tracking component 112. The communications managed by the communications management system 102, which can include communications exchanged between a central scheduler system 114 and the user device(s) 104, communications exchanged between the central scheduler system 114 and the messaging device(s) 106, and/or communications exchanged between the central scheduler system 114 and the messaging system(s) 108. Any of the communications of any type between systems and devices of the environment 100 can be exchanged via one or more networks of various types (e.g., the network(s) 412, as discussed below with reference to FIG. 4).

In some examples, the communications managed by the communications management system 102 can include one or more messages 116 (or "nudges") transmitted by the central scheduler system 114 and to the user device(s) 104, the messaging device(s) 106, and/or the messaging system(s) 108. In those or other examples, the communications managed by the communications management system 102 can include one or more replies 118 transmitted by the user device(s) 104, the messaging device(s) 106, and/or the messaging system(s) 108 and to the central scheduler system 114. Any of the message(s) 116 can be exchanged between the central scheduler system 114 and the user device(s) 104, the messaging device(s) 106, and/or the messaging system(s) 108 at the same or different times as for any of the reply(ies) 118.

In some examples, the central scheduler system 114 can exchange other communications with other devices. The other devices with which the other communications are exchanged can include one or more user devices 120, one or more messaging devices 122, and/or one or more messaging systems 124. Any of the other communications can be exchanged between the central scheduler system 114 and the user device(s) 120, the messaging device(s) 122, and/or the messaging system(s) 124 at the same or different times as for any of the message(s) 116 and/or the reply(ies) 118 exchanged between the central scheduler system 114 and the user device(s) 104, the messaging device(s) 106, and/or the messaging system(s) 108.

The communications management system 102 can exchanged communications with the central scheduler system 114. The communications exchanged between the communications management system 102 and the central scheduler system 114 can include management communications 126. The management communications 126 can include information (e.g., instructions) utilized by the communications management system 102 to identify and/or instruct the central scheduler system 114 to process, generate, and/or transmit communications to the user device(s) 104, the messaging device(s) 106, and/or the messaging system(s) 108.

The communications management system 102 can identify and/or receive feedback communications (or "feedback") 128 associated with the communications exchanged between the central scheduler system 114 and the user device(s) 104, the messaging device(s) 106, and/or the messaging system(s) 108. The feedback 128 can include information and/or indicate one or more corresponding message success levels associated the message(s) 116 and/or one or more corresponding reply success levels associated the reply(ies) 118. In some examples, the message success level(s) can be identified in the feedback 128 via one or more corresponding message success level identifiers (or "message success flag(s)") (e.g., identifier(s) having a value of "1" indicating successful exchanging of the message(s) 116, or a value of "0" indicating unsuccessful exchanging of the message(s) 116). In those examples, the reply success level(s) can be identified in the feedback 128 via one or more corresponding reply success level identifiers (or "reply success flag(s)") (e.g., identifier(s) having a value of "1" indicating successful exchanging of the reply(ies) 118, or a value of "0" indicating unsuccessful exchanging of the reply(ies) 118).

Various types of results can be utilized to indicate whether exchanging of the message(s) 116 is successful. The results can be identified and/or determined based on the feedback 128. In some examples, successful exchanging (e.g., completion of transmission) of the message(s) 116 can be identified and/or determined based on identifying and/or determining that transmission of the message(s) 116 occurs and that no error and/or failure occurs as a result. In those or other examples, successful exchanging (e.g., completion of transmission) of the message(s) 116 can be identified and/or determined based on identifying and/or determining that transmission of the message(s) 116 occurs and that reception of the message(s) 116 by the central scheduler system 114 occurs. In those or other examples, successful exchanging (e.g., completion of transmission) of the message(s) 116 can be identified and/or determined based on identifying and/or determining that transmission of the message(s) 116 occurs and that corresponding reply(ies) 118 from the recipients of the message(s) 116 are transmitted. In those or other examples, successful exchanging (e.g., completion of transmission) of the message(s) 116 can be identified and/or determined based on identifying and/or determining that transmission of the message(s) 116 occurs, that reception of the message(s) 116 by the central scheduler system 114 occurs, and that corresponding reply(ies) 118 are transmitted. In those or other examples, successful exchanging (e.g., completion of transmission) of the message(s) 116 can be identified and/or determined based on identifying and/or determining that transmission of the message(s) 116 occurs, that reception of the message(s) 116 by the central scheduler system 114 occurs, that corresponding reply(ies) 118 are transmitted, and that the corresponding reply(ies) 118 are received by the user device(s) 104, the messaging device(s) 106, and/or the messaging system(s) 108 to which the corresponding reply(ies) 118 are transmitted.

Although various types of feedback 128 can be utilized and/or interpreted as successful and/or unsuccessful completion of communications exchanges, as discussed above in the current disclosure, it is not limited as such. Any of one or more of the types of feedback 128 (e.g., completion of transmission and/or reception of any of the message(s) 116 and/or the reply(ies) 118) can be utilized, selected, and/or interpreted by the communications management system 102 as the results of successful or unsuccessful communications exchanges. The results can be associated with one or more of the types of feedback 128 being utilized, selected, and/or interpreted, based on a level of accuracy identified and/or selected by the communications management system 102, and/or a level of accuracy desired by the operator of the communications management system 102. By way of example, confirming transmission of a message 116, but not reception of the message 116, and without regards to a corresponding reply 118, can provide more reliable but possibly less accurate results. In another example, confirming transmission and reception of a message 116, but without regards to a corresponding reply 118, can provide more accurate but possibly less reliable results. In another example, confirming transmission and reception of a message 116, as well as transmission of a corresponding reply 118, can provide more accurate results. In yet another example, confirming transmission and reception of both a message 116 and a corresponding reply 118, can provide even more accurate results.

Although the terms "message" and "reply" are utilized as types of communications, as discussed above in the current disclosure, it is not limited as such. The terms "message" and "reply" are used merely for convenience, and any communication, including a message or a reply as discussed throughout this disclosure, can be a same type of communication or a different type of communication as any other communication (e.g., message or reply). A message (e.g., a message 116) or a reply (e.g., a reply 118) can be any type of message, such as a push notification, a short message service (SMS) message, a multimedia message service (MMS) message, an email message, a pop-up message, a chat message, or any other type of message. In some examples, the results utilized, selected, and/or interpreted as successful completion of a communications exchange or unsuccessful completion of a communications exchange can be based on the type of message. In those examples, confirmation of transmission of a certain type of message, such as an SMS or MMS message, for which a reply is not required to be received, can be utilized as successful completion of the communications exchange. In those or other examples, confirmation of transmission of a certain type of message, such as a mobile device pop-up message or a messaging device pop-up message, for which a reply may be received based on selection identified via user input received by the user device to acknowledge receipt of the pop-up message, can be utilized as successful completion of the communications exchange.

The scheduler component 110 can be utilized to schedule communications via the management communications 126. In some examples, the communications, including the message(s) 116 and the reply(ies) 118 can be scheduled by the scheduler component 110. In those examples, the message(s) 116 and the reply(ies) 118 can be scheduled and/or rescheduled (e.g., scheduled with different recipients and contents) based on initial data, the feedback 128, and/or results of the results (e.g., results of the analyzing component 130, as discussed below).

The initial data can be utilized to identify groups (e.g., a treatment group, a control group, etc.), individuals in the groups, and/or identify how to schedule communications (or "initial communications"). The initial data can include data associated with the communications management system 102, the user device(s) 104, the messaging device(s) 106, the messaging system(s) 108, the network(s), and/or one or more operators thereof. The initial data can include various types of data (e.g., static features), such as communications data (e.g., communications priorities and/or characteristics) (e.g., previous communications data), device data (e.g., device priorities and/or characteristics), communications management system data (e.g., system priorities and/or characteristics), operational characteristics (e.g., operational characteristics of devices, systems, and/or networks), service provider data (e.g., service provider priorities, characteristics, and/or preferences), and/or recipient data (e.g., recipient priorities, characteristics, and/or preferences).

In some examples, communications and/or data priorities can include information indicating types of communications and/or data of various levels of importance (e.g., highly important messages can have higher priorities than lower importance messages). By way of examples, messages associated with employee safety can be given a higher priority than messages associated with entertainment. The communications priorities can be set by sources of the communications (e.g., the central scheduler system 114) and/or any other system, such as management systems (e.g., the communications management system 102). Characteristics associated with communications and/or data can include amounts of data, sources, intended recipients, types of data, types of communications, confidentiality levels, urgency levels, etc.

In some examples, communications priorities can include information indicating types of communications of various levels of importance (e.g., highly important messages can have higher priorities than lower importance messages). By way of examples, messages associated with employee safety can be given a higher priority than messages associated with entertainment. The communications priorities can be set by sources of the communications (e.g., the central scheduler system 114) and/or any other system, such as management systems (e.g., the communications management system 102). Characteristics associated with communications can include amounts of data, sources, intended recipients, types of data, types of communications, confidentiality levels, urgency levels, etc.

System and/or network priorities can include information indicating types of systems and/or networks of various levels of importance. By way of example, a central scheduler (e.g., the central scheduler system 114) can have a higher priority than a communications management system 102, or a network associated with emergency communications can have a higher priority than a local non-emergency related network. The priority of the central scheduler system 114 can have a higher priority, based on the central scheduler system 114 being utilized to communication messages based on the management communications 126, as well as other possibly higher priority messages. Characteristics associated with systems and/or networks can include types of systems and/or networks, types of components in the systems/networks, importance of systems/networks (e.g., safety systems can have higher importance than entertainment devices), relationships to other devices/systems/networks, types of software/firmware/hardware, etc.

Device priorities can include information indicating types of devices (e.g., a user device 104, a messaging device 106, a messaging system 108, etc.) of various levels of importance. By way of example a device such as a messaging device 106 might be given a higher priority based on a higher level of importance being associated with the message device 106 in comparison to a user device 104. Operation of the message device 106 may have potential safety hazards to employees due to machinery being controlled by the messaging device 106. Characteristics associated with devices can include types of devices, types of components, importance of devices (e.g., safety devices scan have higher importance than entertainment devices), relationships to other devices/systems, types of software/firmware/hardware, networks to which the devices are connected, etc.

Operator priorities can include information indicating types of operators of various levels of importance. By way of example, an operator (e.g., an operator of a user device 104, an operator of a messaging device 106, an operator of a messaging system 108, etc.) such as a heavy machinery operator might be given a higher priority based on a higher level of importance being associated with the heavy machinery operator in comparison to an operator of relatively smaller (e.g., less dangerous) machinery. The heavy machinery operator may be required to mitigate and/or eliminate potential safety hazards to employees due to complex operation of the heavy machinery.

Characteristics associated with operators can include demographics (e.g., age, race, ethnicity, gender, marital status, income, education, employment, etc.), employment history, account information (e.g., address, place of birth, primary spoken language, other spoken languages, skills, hobbies, associated organizations, injuries, disabilities, medical information (e.g., allergies, past treatments, medical records, etc.), insurance information, and any other types of individualized information. Preferences associated with operators can include operator information identifying levels of importance associated with any of the priorities, characteristics, and/or other preferences discussed herein (e.g., communications priorities, communications characteristics, device priorities, device characteristics, system priorities, system characteristics, device operational characteristics, system operational characteristics, network operational characteristics, service provider priorities, service provider characteristics, service provider preferences, recipient priorities, recipient characteristics, recipient preferences, and/or any other types of data associated with communications, devices, systems, networks, service providers, etc.).

Service provider priorities can include information indicating types of service providers of various levels of importance. By way of example, a service provider managing the communications management system 102 might be given a higher priority based on a higher level of importance being associated with the communications management system 102 in comparison to a service provider of a third-party system. The service provider managing the communications management system 102 may perform operations integral to performance of the communications management system 102 and various systems/devices communicatively coupled thereto. Whereas, the third-party service provider may have an indirect impact, if at all, on the communications management system 102 and various systems/devices communicatively coupled thereto.

Characteristics associated with service providers can include a type of service provider, a type of industry, a type of business, revenue, strategic goals, personnel, internal organizations, affiliated organizations, marketing or sales goals, current and/or future marketing or sales strategies and/or programs, equipment, inventory, contractual obligations and/or agreements, supplemental goals (e.g., environment, humanitarian, philanthropic, entrepreneurial, goals), and any other types of service provider information. Preferences associated with service providers can include service providers information identifying levels of importance associated with any of the priorities, characteristics, and/or other preferences discussed herein (e.g., communications priorities, communications characteristics, device priorities, device characteristics, system priorities, system characteristics, device operational characteristics, system operational characteristics, network operational characteristics, service provider priorities, service provider characteristics, service provider preferences, recipient priorities, recipient characteristics, recipient preferences, and/or any other types of data associated with communications, devices, systems, networks, service providers, etc.).

The initial data can include other types of data (e.g., dynamic features). The dynamic features can include, for example, past behavior of operators of the user device(s) 104. By way of example, past behavior associated with an operator can include past communications exchanged between one or more devices of an operator and other devices/systems (e.g., communications exchanged via the central scheduler system 114). Additionally or alternatively, the dynamic features can include one or more of cookies utilized for retrieving web site information, most frequently search terms, interactions with websites, shopping behavior, etc.

One or more candidate messages can be identified, determined, and/or generated, and transmitted as the message(s) 116. Transmitting of the candidate message(s) as the message(s) 116 can be based on one or more corresponding priority levels of the candidate messages and/or information in the candidate messages. A priority level can be associated with an individual utility level (e.g., a job satisfaction level, a job retention level, a safety level, etc.) (e.g., a utility identified by an individual or a corresponding device of the individual), an individual goal (e.g., an individual productivity goal, an individual safety goal, etc.) (e.g., a goal identified by an individual or a corresponding device of the individual), a business goal (e.g., a business productivity goal), a business utility level (e.g., a job satisfaction level, a job retention level, a safety level, etc.) (e.g., a business goal identified in the scheduler component 110) a predicted experiment outcome, etc. By way of example, a candidate message with a priority level can be transmitted as a message 116 prior to another candidate message with a relatively lower priority level. In some examples, the message 116 can include information (or "message information") (e.g., instructions, requests, advice, encouragement, warnings, etc.) associated with a modified result (e.g., a desired or beneficial modification) (e.g., achieving an individual or business goal).

In some examples, the initial data (e.g., initial data utilized to send subsequent messages to a treatment group and a control group of a first group of individuals) can include preliminary (or "previous") results data (or "observational results data") gathered based on preliminary messages sent to individuals that opt in to receiving the messages (e.g., individuals can select inclusion within the second subgroup, by opting in to receiving the messages). The preliminary messages can be sent to a first subgroup (e.g., a group treated similarly as a treatment group) of a second group (e.g., a group treated similarly as a control group) of individuals (e.g., individuals can select inclusion within the second subgroup, by opting out of receiving the messages). The gathered results can include first results data associated with the first subgroup, and second results data associated with a second subgroup of the second group of individuals. The preliminary messages can be transmitted to the first subgroup, but not the second subgroup, based on first preferences data received from the first subgroup, and second preferences data received from the second subgroup. The first preferences data can indicate authorization (e.g., authorization by the first subgroup) of transmission of the preliminary messages. The second preferences data indicates lack of authorization (e.g., lack of authorization by the second subgroup) of transmission of the preliminary messages. The first results data and the second results data can be collected after transmission of the preliminary messages. The first response data and/or the second response data can include similar information, and/or be determined in a similar way as, one or more of the feedback 128, and the experiment results, as discussed below.

In those or other examples, the initial data (e.g., initial data utilized to send subsequent messages to a treatment group and a control group of a first group of individuals) can include preliminary data. The preliminary data can include results data gathered based on preliminary messages sent to individuals. The preliminary messages can be sent regardless of any preferences of individuals receiving the preliminary messages. The preliminary data can include first results data associated with first preliminary messages sent to a first subgroup of a second group of individuals, and second results data associated with second preliminary messages sent to a second subgroup of the second group of individuals. The first results data can be associated with first response data of the first subgroup to the first preliminary messages. The second results data can be associated with the second response data of the second subgroup to the second preliminary messages. The first response data and/or the second response data can include similar information, and/or be determined in a similar way as, one or more of the feedback 128, and the experiment results, as discussed below.

The initial communications (e.g., initial messages of the messages 116) can be scheduled by the scheduler component 110 utilizing the initial data based on recipient target groups (e.g., groups identified by the scheduler component 110, one or more other components of the communications management system 102, and/or one or more other internal or external devices or systems). The target groups can include a treatment group and a control group. In some examples, the treatment group can include one or more of the user device(s) 104, the messaging device(s) 106, the messaging system(s) 108, and/or corresponding operator(s) thereof. In those examples, the control group can include one or more of the user device(s) 104, the messaging device(s) 106, the messaging system(s) 108, and/or corresponding operator(s) thereof.

The treatment group and the control group can be associated with various type of data. In some examples, the treatment group and the control group can be associated with one or more types of shared data (e.g., priority(ies), characteristic(s), and/or preference(s) in common) and one or more types of unshared data (e.g., priority(ies), characteristic(s), and/or preference(s) not in common). The treatment group can be a target group with individuals identified and/or selected to receive the communications. The control group, which can include other individuals that are different from the individuals of the treatment group, can be utilized as a baseline for determining a first efficacy level of communications transmitted to the control group.

The control group (e.g., the baseline associated with the control group) can be utilized to establish a cause-and-effect relationship by isolating an effect of an independent variable (e.g., the independent variable can be changed in the treatment group and kept constant in the control group). The control group and the treatment group can be selected to have common characteristics (e.g., shared features) in in general, to ensure accuracy of the results.

The treatment group and the control group can be selected based on information (e.g., one or more message parameters) utilized to transmit messages (e.g., initial messages) 116 and, possibly, other messages 116 (e.g., subsequent messages). The message parameter(s) can include any information associated with corresponding messages (e.g., how the messages are to be sent, what types of messages are to be sent, what information is to be included in the messages, how information, such as feedback/results, is going to be retrieved based on the messages, etc.). The treatment group can include message parameter(s) selected and/or modified, in comparison to omission of any selection and/or modification of the message parameter(s) for the control group.

As a hypothetical example, to measure an impact of messages sent out with information associated with leave benefits (e.g., family leave, emergency leave, military leave, etc.), a control group including 50% of a total number of individuals with characteristics (e.g., less than one year of tenure) (e.g., low unpaid time off) can be selected, and then modified to be 20%. The percentage of individuals with the characteristics can be modified (e.g., decreased) to 20% of the total number, based on a modified estimate ratio, as discussed below (e.g., a modified estimate ratio determined based on feedback and/or results data resulting from messages (or "nudges")). The control group can be modified to include relatively fewer individuals with the characteristics, to measure an impact of the messages on the individuals with the characteristics in the treatment group. A relatively larger number of messages can be sent out to the individuals with the characteristics, based on the increased size of the treatment group, due to the relatively greater impact of the messages on the individuals in that age group.

In the hypothetical example, discussed above, or as another hypothetical example, to measure an impact of messages (e.g., messages associated with leave benefits, such as family leave, emergency leave, military leave, etc.) sent out with information associated with other characteristics (e.g., less than one year of tenure) (e.g., low unpaid time off) a control group including 50% of a total number of individuals with the other characteristics can be selected, and then modified to be 80%. The percentage of individuals with the other characteristics can be modified (e.g., increased) to 80%, based on a modified estimate ratio, as discussed below (e.g., a modified estimate ratio determined based on feedback and/or results data resulting from messages (or "nudges")). The control group can be modified to include relatively more individuals with the other characteristics, due to a predicted lesser impact of the messages on the individuals with the other characteristics in the treatment group. A relatively smaller number of messages need to be sent out to the individuals with the other characteristics, based on the increased size of the treatment group, due to the relatively lesser impact of the messages on the individuals in that age group.

The treatment group can be identified, defined, and/or selected based on identifying and/or determining probabilities that second efficacy levels of communications transmitted to the control group will be greater than or equal to a threshold efficacy level. The treatment group can be identified, defined, and/or selected based on the identified and/or determined probability being greater than or equal to a predefined probability (e.g., a threshold probability).

Corresponding sizes of the treatment group and the control group can be identified, determined, and/or selected based on a ratio (or "experiment ratio"). By way of example, the treatment group can include 50% of individuals in a total population (e.g., the total population, as discussed below, with reference to FIG. 3), and the control group can include 50% of individuals in the total population. The experiment ratio can be a ratio of a first size of the treatment group to a second size of the control group. In some examples, a percentage of devices/systems in the control group out and a percentage of devices/systems in the treatment group can be represented by the experiment ratio. The percentage of devices/systems in the control group and the percentage of devices/systems in the treatment group can be associated with respective portions of a number (e.g., a predetermined number) of device/systems (e.g., a population) communicatively coupled to the communications management system 102 and the central scheduler system 114.

The experiment ratio can be based on the initial data. In some examples, the initial data can include initial prediction data (or "predictors") of one or more subgroups of the population. The subgroup(s) can include a treatment group associated with members (or "individuals") (e.g., systems/devices/operators) of the population for who the communications are predicted to be most effective. In some examples, an individual can be included in the treatment group based on the initial data indicating that a probability of a treatment group communication effectiveness level results from transmission of a message 116 is greater than or equal to a first threshold probability. In those examples, an individual can be included in the control group based on the initial data indicating that a probability of a control group communication effectiveness level results from transmission of a message 116 is greater than or equal to a second threshold probability. The second threshold probability for the control group can be greater than the first threshold probability for the treatment group, so that the control group can serve as the baseline for experiment results associated with the treatment group.

The message analyzing component 112 can analyze results associated with portions of an experiment (e.g., transmission of the message(s) 116). The results can be analyzed based on the feedback 128 and/or other feedback (e.g., individually reported feedback). The results can be utilized to modify the experiment ratio as a modified experiment ratio (e.g., a modified ratio utilized to perform a modified experiment, in a similar way as for the initial experiment). The modified experiment ratio can be based on the treatment group communication effectiveness levels and the control group communication effectiveness levels, the modified experiment ratio indicating a modified first size of the treatment group and a modified second size of the control group. The modified experiment ratio can be based on a first efficacy level associated with the treatment group (e.g., a first efficacy level associated with the treatment group communication effectiveness levels), and a second efficacy level associated with the control group (e.g., a second efficacy level associated with the control group communication effectiveness levels). The modified experiment ratio can be identified based on various other results (e.g., results of the analyzing component 130, as discussed below).

The other feedback (e.g., individually reported feedback) can include various types of feedback based on inquiries sent to individuals. The inquiries can be sent as inquiry messages including requests, and/or presenting opportunities, for individual feedback. The inquiry messages can include questions for feedback, prompts for opinions, etc. about any of the feedback 128 and/or the experiment results, discussed below. The questions or prompts for opinions can be used to receive the other feedback (e.g., data and/or selections) via user input received by various devices (e.g., the user device(s) 104, the messaging device(s) 106, the messaging system(s) 108, and/or the third-party devices 132). The selections can include selections via mouse clicks, or any input mechanism, of buttons (e.g., buttons including various choices of accuracy, such as a "1" for very accurate and "5" for not accurate at all), data entry via selections via keyboard key presses, or any input mechanism, etc., associated with statements about the feedback 128 and/or the experiment results).

In some examples, the other feedback (e.g., individually reported feedback) can be different from the feedback 128 based on the feedback 128 including automated feedback (e.g., feedback not expressly reported by individuals) (e.g., feedback indicated and/or associated with replies (e.g., the reply 118). Such as the message read time, in some instances the user may "read" the message but actually only open it for a short period of time and close the message. In those or other examples, the other feedback can be received via the replies 118 and/or other replies, in a similar way as for the feedback 128.

The communications management system 102 can include a results analyzing component 130 to analyze other results of the experiment. In some examples, the results analyzed by the analyzing component 130 can include characteristics and/or behavior data associated with individuals in the treatment group, in comparison to other characteristics and/or behavior data associated with other individuals in the control group. The results can be identified based on information (e.g., information about reducing unpaid time off hours) in messages (e.g., the first messages). By way of example, message information can include reminders, guidance, suggestions, encouragement, and/or other incentives to modify characteristics and/or behavior data. By identifying modifications in the characteristics and/or behavior data, the results analyzing component 130 can determine whether the first messages were effective. Effectiveness of the first messages can be determined based on changes in the characteristics and/or the behavior data (e.g., a decrease in a number of unpaid time off hours associated with an individual, after receiving the first message with information about reducing unpaid time off hours or other leave options, such as family or emergency leave).

The modified experiment ratio can be utilized to adjust corresponding sizes of the treatment group and the control group according to results of the experiment. In some examples, a size of the treatment group can be modified based on results of the experiment indicating that the experiment was effective with respect to the treatment group. The modified second size can be greater than the modified first size based on the second efficacy level being greater than the first efficacy level. By way of example, the treatment group can be modified to include 80% of individuals in the total population, and the control group can include 20% of individuals in the total population.

In some examples, the modified second size can be less than the modified first size (e.g., the treatment group can be modified to include 20% of individuals in the total population, and the control group can include 80% of individuals in the total population), based on the second efficacy level being less than the first efficacy level. Effectiveness of the experiment utilized to modify the experiment ratio can be determined based on data (or "effectiveness data") identified (e.g., predetermined) as being associated with and/or indicating effectiveness of the experiment.

The scheduler component 110 and the message analyzing component 112 can utilize the identified and/or generated data (e.g., the preliminary data, the initial data, the feedback 128, the other feedback (e.g., individually reported feedback), the effectiveness data, the results (e.g., the experiment results), etc.) to initially define populations for an experiment (e.g., transmission of messages 116 to begin an experiment), and/or to continuously redefine the populations. The identifying, selecting, and/or redefining of the populations (e.g., the modifying of the experiment ratio) can be performed iteratively to customize management of the communications, and/or to identify, collect, and/or generate additional data utilized to tailor subsequent communications between the communications management system and recipient target groups.

The results of the experiment, the modified experiment, and/or any subsequent experiments, can be utilized to tailor subsequent communications. Any subsequent communications can be sent to individuals based on the results. The individuals to which the subsequent communications are transmitted can be identified based on data (e.g., data that includes any of the types of data in the initial data) associated with the subsequent communications to be transmitted being similar to data of the communications for which the results of the experiments were obtained. By way of example, individuals with characteristics matching characteristics of individuals for which relatively higher effectiveness levels were achieved during the experiment(s) can be included as recipients of the subsequent communications of the same type as the communications in the experiment(s). Alternatively or additionally, individuals with matching characteristics to other characteristics of other individuals for which relatively lower effectiveness levels were achieved during the experiment(s) can be excluded as recipients of the subsequent communications of the same type as the communications in the experiment(s).

As a hypothetical example, messages utilized to encourage employees to wear safety shoes can be sent out. To determine employees to whom the messages will be sent, an experiment can be performed using the scheduler component 110 and the message analyzing component 112. The scheduler component 110 and the message analyzing component 112 can select a number of employees to be in a treatment group and a number of employees to be in a control group. Initial data (e.g., research data) associated with static factors and dynamic factors can be utilized to identify which types of employees will most likely be responsive to messages about wearing safety shoes. The initial data can be utilized to identify, based on feedback (e.g., feedback 128), which types of messages will be most effective.

The feedback 128 can indicate various types of information utilized to identify whether transmission of messages is successful/effective, and/or efficacy of information included in the messages. In some examples, information in the feedback 128, which can be utilized to identify whether messages will be effective, can include information indicating whether previous communications of similar were successful, as discussed above (e.g., information indicating that transmission of the message(s) 116 is successful and that reception of the message(s) 116 is successful; or information indicating that transmission of the message(s) 116 is successful and that transmission of corresponding reply(ies) 118 from the recipients of the message(s) 116 is successful; or information indicating that transmission of the message(s) 116 is successful, that reception of the message(s) 116 by the central scheduler system 114 is successful, and that transmission corresponding reply(ies) 118 is successful; or information indicating that transmission of the message(s) 116 is successful, that reception of the message(s) 116 is successful, that transmission of corresponding reply(ies) 118 is successful, and that reception of the corresponding reply(ies) 118 is successful).

The employees added to the control group can be selected based on existing data indicating that those employees are likely to respond predictably with certain results. The employees added to the treatment group can be selected based on a desire to identify the most effective way to send communications to those employees. The employees selected for the control group and the treatment group can be by determining, based on research data, and on any of the characteristics, priorities, and preferences, as discussed above, a preference, a priority, an urgency, etc. associated with communications of a type being sent to the employees. Research data (e.g., internal and/or external research data) can be utilized to select employees based on determining that employees with certain preferences, priorities, and/or urgencies are associated with less than average levels of utilization and/or adherence to static factors or dynamic factors. By way of example, employees of a characteristic (e.g., employees under 20 years of age) that are identified as exhibiting behavior of a type (e.g., not wearing safety shoes) can be selected as recipients of the groups (e.g., the treatment group and the control group) for receiving nudges associated with obtaining safety shoes. By way of another example, employees of a tenure of zero-six months that are associated with exhibiting behavior of a type (e.g., using higher than average levels of unpaid time off hours) can be selected as recipients of the groups (e.g., the treatment group and the control group) for receiving nudges associated with decreasing levels of unpaid time off hours.

Results of the experiment(s) (e.g., initial experiments, and/or any subsequent experiment(s)) can be utilized in a continuing fashion for future messages (e.g., messages about wearing safety shoes, reducing unpaid time off hours, etc.). As employees change, such as previous employees leaving or incoming employees being hired, the information from the experiment can be used to fine tune transmissions of communications regarding safety shoes to certain employees. Subsequent communications can be performed based on the experiment results, so as to be able to effectively and efficiently encourage employees to wear safety shoes, based on those employees having been identified as being the most likely to be responsive to those types of communications (e.g., the identified employees being the most likely employees to start to wear safety shoes if the messages are sent out to them). This can drastically reduce communications and optimize utilization of system, network, and device resources by eliminating transmissions of communications that would have a low likelihood of achieving desired results. Unselected users/operators and/or their devices that are identified from experiment results as benefitting and/or responding relatively less (e.g., having behavior data indicating only minor adjustments) to messages can be filtered out, ignored, and/or omitted from target populations (e.g., recipients) receiving subsequent communications. Recipients for transmissions of subsequent communications can be continuously redefined based on results analyzed for previous communications.

Although messages can be analyzed and utilized to identify recipients for subsequent messages to various devices (e.g., the user device(s) 104, the messaging device(s) 106, and/or the messaging system(s) 108), as discussed throughout this disclosure, it is not limited as such. In some examples, any messages associated with third-party devices 132 can be analyzed and utilized to identify recipients for subsequent messages to various devices (e.g., the user device(s) 104, the messaging device(s) 106, the messaging system(s) 108, and/or the third-party devices 132), in a similar way as discussed herein for the message(s) 116 and/or the reply(ies) 118. In some examples, any messages associated with the user device(s) 104, the messaging device(s) 106, the messaging system(s) 108 can be analyzed and utilized to identify recipients for subsequent messages to various devices (e.g., the third-party devices 132), in a similar way as discussed herein for the message(s) 116 and/or the reply(ies) 118.

Although groups identified and utilized to determine how to schedule communications (e.g., initial communications and, possibly, one or more subsequent communications, etc.) can include the treatment group and the control group, as discussed above in this disclosure, it is not limited as such. In some examples, the experiment including transmission of the communications (e.g., initial communications and, possibly, one or more subsequent communications, etc.) can include determining one or more other treatment groups, which can be utilized in combination with the treatment group as discussed throughout the current disclosure, in a similar way as for the treatment group. By way of example, the one or more other treatment groups can be determined in a similar way as for the treatment group, but with individuals with different priorities, characteristics, and/or preferences than for the treatment group. In such an example or in other examples, other messages can be sent out to the other treatment groups, in a similar way as for the treatment group, to use and/or gather other data (e.g., other preliminary data, other initial data, other feedback 128, other individually reported feedback), the effectiveness data, the results (e.g., the experiment results), etc.). The other data can be utilized in a similar way as for the data determined for the treatment group (e.g., the preliminary data, the initial data, the feedback 128, the individually reported feedback).

Although the treatment group and the control group can be identified and utilized, as discussed above in this disclosure, it is not limited as such. In some examples, the control group can be identified, determined, selected, and/or generated as one of the other treatment groups. By way of example, a first treatment group and a second treatment group can be identified, and the second treatment group can be selected as the control group. By selecting the second treatment group as the control group, any selection or modification of information (e.g., selected and/or modified parameters) utilized to send messages to the treatment group can be omitted from the control group.

As a hypothetical example, groups can be selected to determine an impact of messages sent out with information about leave benefits. A first treatment group can be selected to include individuals with less than one year of tenure. A second treatment group can be selected to include individuals with low unpaid time off. A control group can be selected to include individuals without less than one year of tenure (e.g., with one or more years of tenure) and/or without low unpaid time off. Preliminary messages previously sent out to individuals of a total population can be identified based on the preliminary messages including general information about leave. Messages with specific information about a type of leave (e.g., family leave) can be sent out, including first messages sent to the first treatment group, second messages sent the second treatment group, and third messages sent to the control group. Feedback/results can be identified for the first messages, the second messages, and the third messages, and compared to one another. Modifications to corresponding sizes of the first treatment group, the second treatment group, and the control group can be made for sending out subsequent messages. If the first treatment group is determined to be associated with an improvement in usage of family leave that is more than for the second treatment group and the control group, the size of the first treatment group can be increased relative to corresponding sizes of the second treatment group and the control group.

In some examples, one or more treatment groups are utilized for experiment(s) including transmission of the communications (e.g., initial communications and, possibly, one or more subsequent communications, etc.), without any control group. In those examples, resulting data (e.g., other preliminary data, other initial data, other feedback 128, other individually reported feedback), the effectiveness data, the results (e.g., the experiment results), etc.) based on the messages can be utilized to compare the resulting data of one or more of the treatment group(s) with the resulting data of one or more others of the treatment group(s), in a similar way as for comparing resulting data for a treatment group with resulting data for a control group.

As a hypothetical example, groups selected to determine an impact of messages sent out with information about leave benefits can include a first treatment group and a second treatment group, but not a control group. The first treatment group can be selected to include individuals with less than one year of tenure. The second treatment group can be selected to include individuals with low unpaid time off. Messages with specific information about a type of leave (e.g., family leave) can be sent out, including first messages sent to the first treatment group and second messages sent the second treatment group. Feedback/results can be identified for the first messages and the second messages, and compared to one another. Modifications to corresponding sizes of the first treatment group and the second treatment group can be made for sending out subsequent messages. If the first treatment group is determined to be associated with an improvement in usage of family leave that is more than for the second treatment group and the control group, the size of the first treatment group can be increased relative to the size of the second treatment group.

In some examples, the treatment group(s) and, possibly, the control group, utilized to control communications and gather results/feedback can be selected and/or modified based on results/feedback not indicating differences between corresponding results/feedback of one or more groups in comparison to one or more other groups. By way of examples, messages sent out to a treatment group based on different message parameter(s) than for a control group, which result in similar feedback results (e.g., feedback/results with levels of differences less than a threshold level) for the treatment group and the control group, can be utilized to select and/or modify characteristics, preferences, and/or priorities associated with individuals of the treatment group and/or the control group, and/or to select and/or modify message parameter(s) for subsequent messages (e.g., subsequent messages resulting in different results/feedback for the treatment group than for the control group).

In some examples, the treatment group and the control group can be utilized to control communications to be sent to the treatment group but not the control group. Results/feedback for the treatment group can be compared to results/feedback for the control group, based on the communications being sent to the treatment group but not the control group.

As a hypothetical example, groups selected to determine an impact of messages sent out with information about leave benefits can include a treatment group including individuals with less than one year of tenure, and a control group including individuals without less than one year of tenure. Preliminary messages previously sent out to individuals of a total population can be identified based on the preliminary messages including general information about leave. Messages with specific information about a type of leave (e.g., family leave) can be sent out, including first messages sent to the first treatment group and second messages sent the second treatment group. Feedback/results can be identified for the first messages and the second messages, and compared to one another.

In the hypothetical example, selections and/or modifications (e.g., modified message parameter(s)) can be utilized to send subsequent messages about a different type of leave (e.g., emergency leave). The subsequent messages can include first subsequent messages sent to the treatment group and second subsequent messages sent to the control group. Modifications to corresponding sizes of the first treatment group and the second treatment group can be made, if the first treatment group is determined to be associated with an improvement in usage of emergency leave that is more than for the control group. The size of the treatment group being increased for additional messages relative to the size of the control group, based on the treatment group having a larger improvement in usage of emergency leave compared to the control group.

Additionally or alternatively, selections and/or modifications to characteristics, preferences, and/or priorities associated with individuals of the treatment group and/or the control group can be utilized to send subsequent messages, in a similar way as for the messages with the modified message parameter(s). Such selections and/or modifications can be utilized to obtain feedback/results for sending additional messages, in a similar way as for the messages with the modified message parameter(s).

Figure 2:
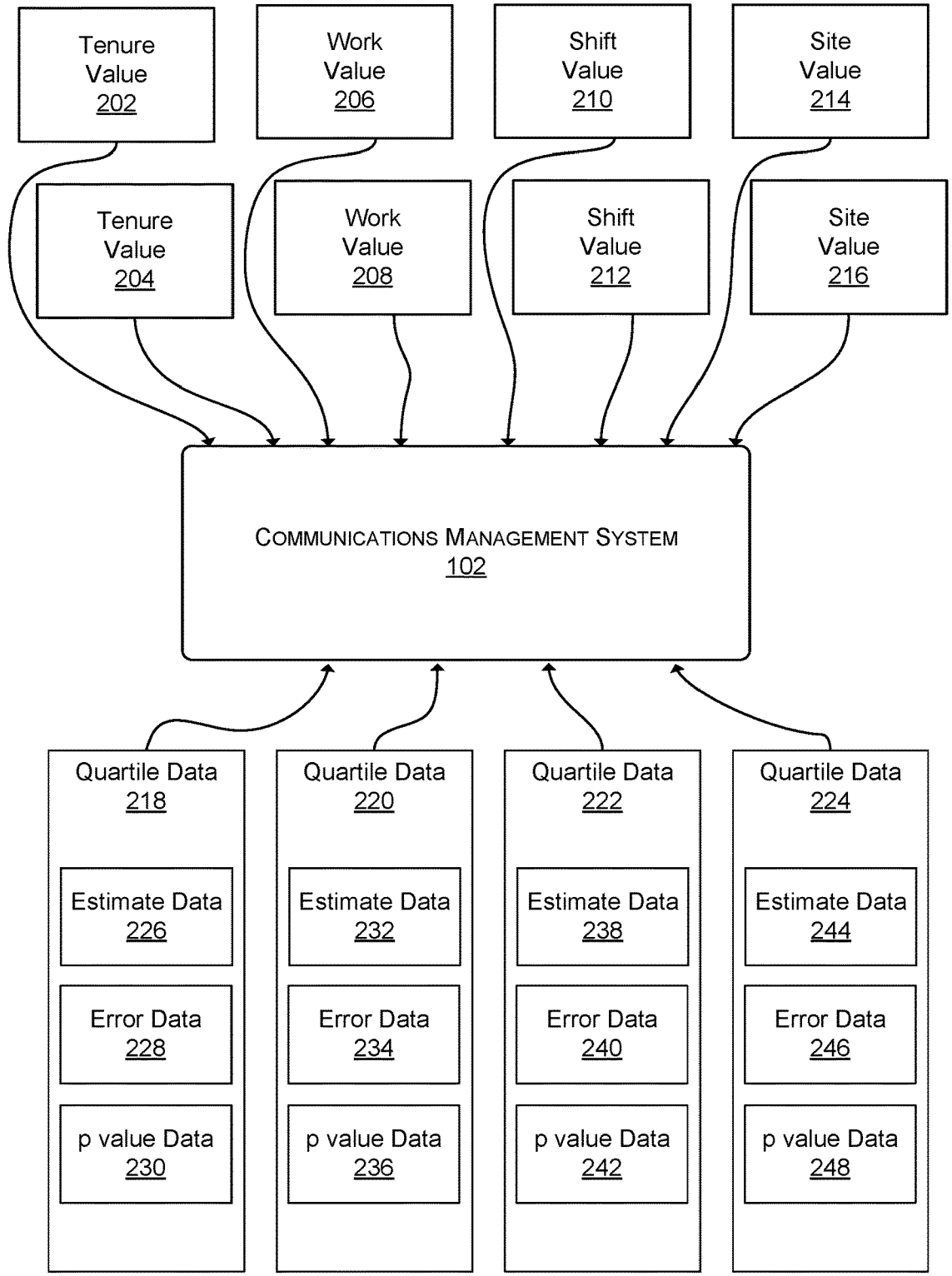
FIG. 2 is an illustrative environment for managing causal forest algorithms utilized to perform personalized communications management, in accordance with at least one embodiment.

FIG. 2 is an illustrative environment 200 for managing causal forest algorithms utilized to perform personalized communications management, in accordance with at least one embodiment. In the environment 200, a communications management system (e.g., the communications management system 102, as discussed above with reference to FIG. 1) can be utilized to manage communications based on results associated with a causal forest algorithm. The causal forest algorithm can be utilized for performing an experiment (e.g., any experiment, as discussed above with reference to FIG. 1.

According to the causal forest algorithm, variables (e.g., variables, show below in a Table 1, associated with a type of data, such as in the initial data, as discussed above with reference to FIG. 1) can be identified as being the most relevant (e.g., important) for splitting trees in a generalized random forest. The variables (e.g., the most important and/or significant variables) can be identified and utilized to form candidate splits of observations (e.g., research results identified as observations, based on the initial data) into groups.

| Variable | Importance Levels | (1) |
|---|---|---|
| tenure = 0-6 months | 13% | |
| business type = fulfillment | 12% | |
| shift = night | 12% | |
| tenure = 12-18 months | 11% | |
| business type = sales | 11% | |
| tenure = 6-12 months | 10% | |

The variables can be associated with importance levels. Corresponding importance levels with which the variables are associated can be identified as indicators of how likely it is that the variables represent corresponding individuals that are likely have to modified behavior data based on receiving messages. By way of example, any individual having a variable (e.g., variable of a tenure of zero-six months) can be identified and included as part of a group selected to receive messages, based on data and/or research information indicating that individuals with a tenure of zero-six months are likely to decrease unpaid time off hours after receiving a message associated with information about, and/or instructions, advice, recommendations, and/or encouragement for decreasing unpaid time off hours. In some examples, the importance levels can be identified and/or measured according to a percentage of trees in an ensemble (e.g., an ensample determined for analysis via the causal forest algorithm) associated with a particular feature (e.g., a corresponding variable). In those examples, although the percentages of trees can be utilized to determine diverse heterogenous impacts of messages receiving by individuals, the percentages of trees may be rough diagnostics for the importance levels when the features are correlated.

By way of example, relevant variables can be identified, such as a tenure variable having a tenure value 202 (e.g., zero-six months) with an importance level of 13%, a tenure variable having a tenure value 204 (e.g., 12-18 months) with an importance level of 12%, a business type (or "work") variable having a work value 206 (e.g., fulfillment) with an importance level of 12%, a business type (or "work") variable having a work value 208 (e.g., sales) with an importance of 11%, a shift variable having a shift value 210 (e.g., night) with an importance of 12%, and a tenure variable having a tenure value (e.g., 6-12 months) with an importance of 10%. Other variables (e.g., a shift variable having a shift value 212, a site variable having a site value 214, and a site variable having a site value 216) can be ignored if, for example, they have corresponding levels of importance that are less than or equal to 10%.

The trees (e.g., the data) can be split into groups (or "quartiles") based on whether a covariant value requires a split. By way of example, a single split can be selected to maximize an objective function associated with variations of treatment effect estimates (e.g., a predicted treatment effect) across resulting subgroups (e.g., two resulting subgroups). The data can be split into groups (or "quartiles") based on a predicated treatment effect.

In some examples, the quartiles can include a quartile (e.g., a first quartile) with quartile data (e.g., first quartile data) 218, a quartile (e.g., a second quartile) with quartile data (e.g., second quartile data) 220, a quartile (e.g., a third quartile) with quartile data (e.g., third quartile data) 222, and a quartile (e.g., a fourth quartile) with quartile data (e.g., fourth quartile data) 224. The quartiles, as shown below in Table 2, can include unpaid time off hours estimates, standard errors, and p values (e.g., probability values).

| Groups | Estimates | Standard Errors | p values | (2) |
|---|---|---|---|---|
| First quartile | 0.182 | 0.116 | 0.117 | |
| Second quartile | 1.509 | 0.108 | 0.000 | |
| Third quartile | 1.853 | 0.114 | 0.000 | |
| Fourth quartile | 4.160 | 0.189 | 0.000 | |

Whether the values associated with the corresponding groups are statistically significant can be identified based on the estimates (e.g., higher estimates can be utilized to indicate higher statistical significance). Standard errors can represent estimations of accuracies of predictions utilized to determine the estimates (e.g., standard errors can be standard deviations of a sampling distribution or estimates of the standard deviation). The standard errors can be calculated by dividing a standard deviation of a sample (e.g., a treatment group) by a square root of a sample size (e.g., the total population, as discussed below with reference to FIG. 3). P values can represent probability scores that can be used to establish a statistical significance of an observed effect (e.g., a significance of results (e.g., estimates) associated with a group). The p values be calculated as probabilities of getting a test statistic (e.g., a data summary) at least as extreme as an observed one, assuming a null hypothesis is true.

In some examples, the quartile data 218 can include estimate data 226 with a value 0.182 hours (hrs), error data 228 with a value of 0.116, and p value data 230 with a value of 0.117; the quartile data 220 can include estimate data 232 with a value 1.509 hrs, error data 234 with a value of 0.108, and p value data 236 with a value of 0.000; the quartile data 222 can include estimate data 238 with a value 1.853 hrs, error data 240 with a value of 0.114, and p value data 242 with a value of 0.000; and the quartile data 224 can include estimate data 244 with a value 4.160 hrs, error data 246 with a value of 0.189, and p value data 248 with a value of 0.000.

The groups as shown above in Table 2 can be identified based on the predicted impact of a message associated with an individual. Estimate data (or "estimates") (e.g., the estimates in the estimate data 226, 232, 238, and 244) can be calculated based on augmented inverse propensity weights, and utilized to infer randomized and observational settings. An overall impact of a message associated with a treatment group utilized to produce data in the four quartiles can be determined, with the overall impact being that the treatment group has a relatively lower unpaid time off balance (e.g., 1.92 hours of lower unpaid time off for messaged individuals, based on the messages). Such overall impact can be utilized to modify an experiment ratio be a modified experiment ratio with a larger size associated with the treatment group. Based on the estimated of 4.16 unpaid time off hours associated with the fourth quartile, a determination that an average impact of estimates for unpaid time off is being driven by associates in the fourth quartile may be made, based on variables indicated in Table 1.

As a hypothetical example, messages can be sent out to various individuals. The causal forest algorithm can be utilized to identify effects of the transmitted messages based on determining the messages were received by the individuals, and on determining there are changes in behavior data associated with the individuals. The individuals may receive their message and modify their behavior to decrease unpaid time off hours. The results of the analysis utilizing the causal forest algorithm can be utilized to identify the individuals that have a relatively larger improvement than for other individuals. Characteristics of the individuals that are predicted to have the relatively larger improvement can be utilized as variables (e.g., variables with relatively higher importance levels), in order to determine, based on results of analysis via the causal forest algorithm, how to perform transmission of subsequent messages more effectively. Other individuals (e.g., newly hired individuals) that have tenure of less than six months can be targeted in subsequent transmissions of messages at future times, based on experiment results indicating that those individuals will have a relatively greater likelihood of benefitting from the messages by reducing their unpaid time off hours.

Figure 3:
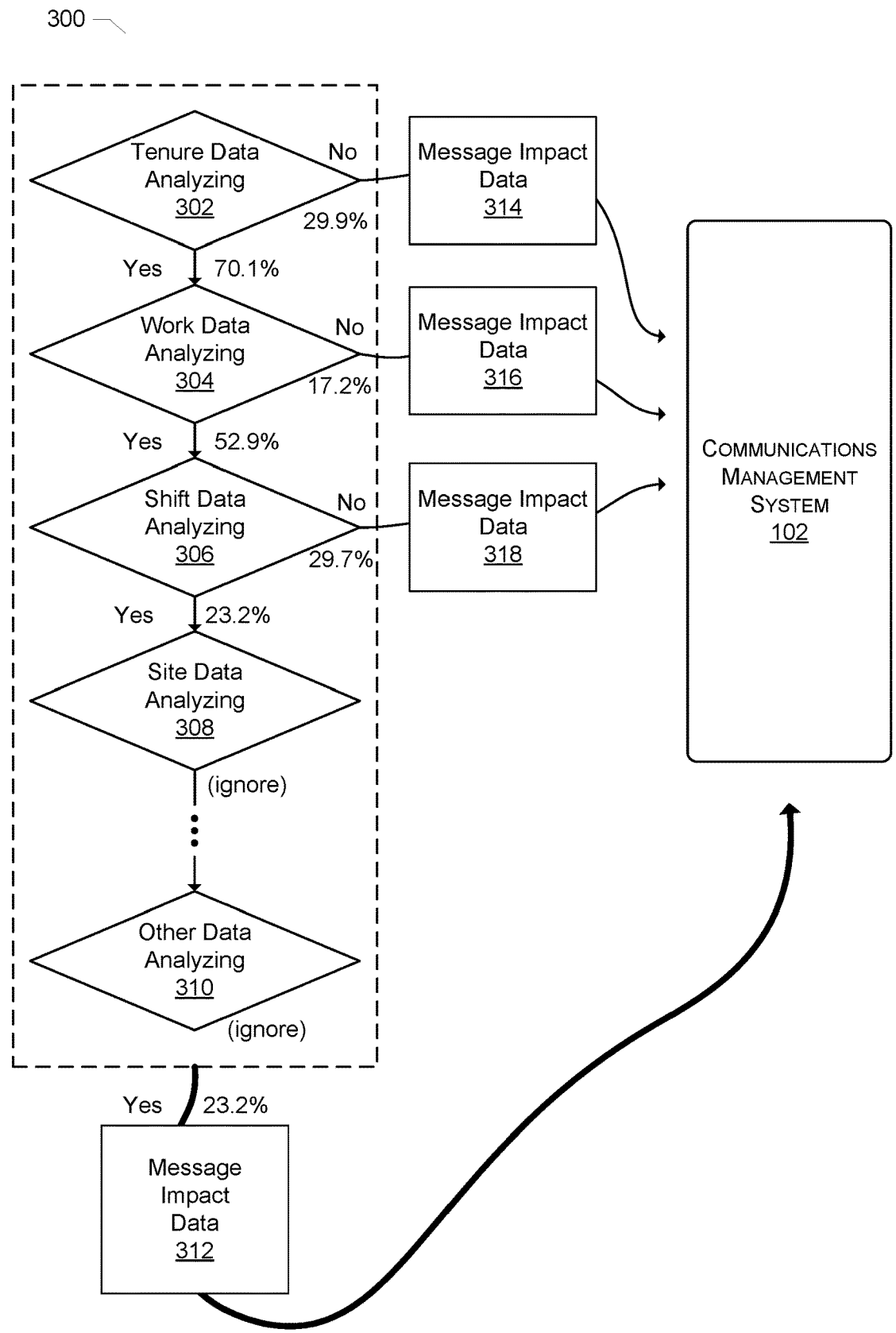
FIG. 3 is an illustrative environment for managing decision tree-based algorithms utilized to perform personalized communications management, in accordance with at least one embodiment.

FIG. 3 is an illustrative environment 300 for managing decision tree-based algorithms utilized to perform personalized communications management, in accordance with at least one embodiment. In the environment 300, a decision tree can be utilized to partition individuals into subgroups including different magnitudes of treatment effects.

Individuals being randomly assigned to a treatment group or a control group can be utilized for analysis via the decision tree. Features can be selected to partition a population (or "total population") (e.g., total number of individuals identified or purposes of an experiment) into relatively higher and relatively lower impact groups, while taking intragroup variability (e.g., variability in impact from a message) into account against overfitting. Characteristics can be identified for analysis, including tenure data analyzing 302 (e.g., analyzing individuals associated with a tenure of less than six months), business type (or "work") data analyzing 304 (e.g., analyzing individuals working in a fulfillment center), shift data analyzing 306 e.g., analyzing individuals associated with a day shift), site data analyzing 308 (e.g., ignore as being insignificant), and any other data analyzing 310 (e.g., ignore as being insignificant). Any number of different types of data can be utilized for analysis, as part of the tree. The characteristics can be identified such that a predetermined number of individuals (e.g., 100, 1000, 4000, 10,000, etc. individuals) are included for corresponding analysis (e.g., any of the analyzing 302, 304, 306, 308, and 310). By identifying a number of individuals in a leaf of the tree (e.g., a number of individuals in a treatment group) as being greater than a threshold number (e.g., 4000), an excessive number of splits (e.g., depth) of the tree can be avoided, thereby simplifying analysis using the tree. A number of individuals in the control group can be set as a percentage of a number of individuals in the total population, as discussed below. Initially, the treatment group can include 50% of individuals in the total population, and the treatment group can include 50% of individuals in the total population.

Although the characteristics utilized for the estimation algorithm (e.g., the decision tree) can include various types of characteristics (e.g., characteristics associated with one or more of tenure data, work data, shift data, site data, etc.) as discussed above in the current disclosure, it is not limited as such. Any types of characteristics including one or more of characteristics associated with one or more of tenure data, work data, shift data, site data, etc. can be utilized, one or more other characteristics (e.g., different characteristics), or a combination of the characteristics associated with one or more of tenure data, work data, shift data, site data, etc. and one or more other characteristics (e.g., different characteristics).

As a hypothetic example, the characteristics utilized for the estimation algorithm (e.g., the decision tree) can be identified based on initial data, research data, etc., as discussed above with reference to FIG. 1, being determined to indicate the characteristics are likely to result in results/feedback indicating successful improvements by individuals with respect to the characteristics. The initial data and/or the research data can be utilized to determine that selecting one or more characteristics such as tenure data, work data, and shift data, for identifying individuals for sending out messages about unpaid time off hours is likely to have an impact on individual levels of unpaid time off hours. The messages can be sent to individuals associated with the tenure data, work data, and shift data, to determine which characteristics result in the greatest levels of improvements in levels of unpaid time off hours. If improvements are noticeable for individuals with a tenure of less than six months, a determination can be made to send subsequent messages to other individuals that have a tenure of less than six months.

Impacts of communication based on various types of data can be identified for different portions (e.g., splits) of the tree. In some examples, a message impact value (e.g., message impact data 312) associated with, for example, 23.2% of a total population (e.g., 23.2% of a total population that have a tenure of less than six months, that work in a fulfillment center, and that work a day shift) can be identified as an amount of impact based on received messages (e.g., as indicated by the message impact data 312 having a value of a reduction of, for example, 2.39 hours based on receiving messages). The message impact value 312 can be identified via the tenure data analyzing 302, the work data analyzing 304, and the work data analyzing 304. In some examples, message impacts data 314 can be identified via the tenure data analyzing 302, message impacts data 316 can be identified via the work data analyzing 304, message impacts data 318 can be identified via the shift data analyzing 306 (e.g., message impacts data can be ignored via the site data analyzing 308, based on the impact of individuals at a certain site being relatively less than for the other characteristics, such as an amount of tenure, a type of work, and a type of shift).

Based on the tenure data analyzing 302, data associated with, for example, 70.1% of individuals of the total population being identified as individuals that have a tenure of less than six months can be identified, in comparison to data associated with, for example, 29.9% of individuals of the population identified as individuals that do not have a tenure of less than six months. The data associated with the individuals that do not have a tenure of less than six months can include a relatively lesser amount (e.g., as indicated by the message impact data 314 having a relatively lesser value) (e.g., as indicated by the message impact data 314 a value, for example, of a reduction of, for example, 0.75 hours of unpaid time off) in comparison to the average amount of impact (e.g., a reduction of, for example, 2.39 hours based on receiving message).

Based on the work data analyzing 304, a value associated with, for example, 52.9% of individuals of the total population can be identified as individuals that have a tenure of less than six months and that work in a fulfillment center, in comparison to data associated with, for example, 17.2% of individuals in the total population identified as individuals that have a tenure of less than six months and that do not work in a fulfillment center. The data indicated by the message impact data 316 can be identified as a similar amount (e.g., as indicated by the message impact data 316 having a similar lesser value) (e.g., as indicated by the message impact data 316 having a value of a reduction of, for example, 2.4 hours of unpaid time off) in comparison to an average amount of impact (e.g., a reduction of, for example, 2.39 hours based on receiving message).

Based on the shift data analyzing 306, data associated with, for example, 23.2% of individuals of the total population being identified as individuals that have a tenure of less than six months, that work working in a fulfillment center, and that have a day shift, in comparison to data associated with, for example, 29.7% of individuals of the total population that have a tenure of less than six months, that work working in a fulfillment center, and that do not work a day shift. The data indicated by the message impact data 318 can include a relatively lesser amount (e.g., as indicated by the message impact data 318 having a relatively lesser value) (e.g., as indicated by the message impact data 318 including a value of a reduction of, for example, 2.1 hours of unpaid time off), in comparison to the average amount of impact (e.g., a reduction of, for example, 2.39 hours based on receiving message).

Based on the various percentages and message impact data 312, 314, 316, and 318, impacts on individuals can be compared based on characteristics of the individuals. A sub-group of individuals associated with the tenure of less than six months (e.g., individuals that decrease their unpaid time off balance by, for example, 2.39 hours) can be identified as being more greatly impacted by messages than a sub-group of remaining individuals associated with the tenure of greater than six months (e.g., individuals that decrease their unpaid time off balance by, for example, 0.75 hours, as indicated by the message impact data 314). A sub-group of individuals associated with the night shift (e.g., individuals that decrease their unpaid time off balance by, for example, 2.4 hours, as indicated by the message impact data 316) can be identified as being more greatly impacted by messages than a sub-group of remaining individuals associated with the day shift (e.g., individuals that decrease their unpaid time off balance by, for example, 2.3 hours).

Results, as shown below in Table 3, of the analyzing via the decision tree can be utilized to identify whether variations between leaf nodes of the tree are statistically significant.

| Groups | Estimates | Standard Errors | p values | (3) |
|---|---|---|---|---|
| leaf2-leaf1 | 1.658711 | 0.398664 | 0.0001 | |
| leaf3-leaf1 | 1.353901 | 0.365883 | 0.0001 | |
| leaf4-leaf1 | 1.643629 | 0.345667 | 0.0000 | |

Whether the values associated with the corresponding groups are statistically significant can be identified based on the estimates (e.g., higher estimates can be utilized to indicate higher statistical significance). Standard errors can represent estimations of accuracies of predictions utilized to determine the estimates (e.g., standard errors can be standard deviations of a sampling distribution or estimates of the standard deviation). The standard errors can be calculated by dividing a standard deviation of a sample (e.g., a treatment group) by a square root of a sample size (e.g., the total population). P values can represent probability scores that can be used to establish a statistical significance of an observed effect (e.g., a significance of results (e.g., estimates) associated with a group). The p values be calculated as probabilities of getting a test statistic (e.g., a data summary) at least as extreme as an observed one, assuming a null hypothesis is true.

Four leaves, as shown above in Table 3, can include a first leaf (e.g., leaf1, associated with individuals having tenure of less than six months), a second leaf (e.g., leaf2, associated with individuals of tenure of zero-six months, and working a day shift in a fulfillment center), and a third leaf (e.g., leaf3, associated with individuals of tenure of zero-six months, and working non-day shifts in a fulfillment center), and a fourth leaf (e.g., leaf4, associated with individuals of tenure of zero-six months, not working in a fulfillment center). The subgroup of associates with tenure greater than six months can be utilized as a reference, to set (e.g., establish) an incremental impact of a message with respect to other leaves that is significant.

Estimates as shown above in Table 3 can be utilized as to infer randomized and observational settings. Whether the values associated with the corresponding groups are statistically significant can be identified based on the estimates (e.g., higher estimates can be utilized to indicate higher statistical significance).

Based on estimates as shown above in Table 3, utilizing the causal forest algorithm or the decision tree algorithm can improve estimates of effectiveness for exchanging communications. The improved estimates can be utilized to identify groups of individuals that are more likely to respond to messages and/or notifications with respect to various priorities. The characteristics of the individuals can be monitored and utilized to transmit subsequent messages more effectively. The characteristics of the individuals can be monitored and utilized to refrain from transmitting messages that are estimated to not be effective, thereby minimizing unnecessary expenditure of valuable system, device, and network resources.

Although estimation algorithms can include causal forest algorithm(s) and decision tree-based algorithm(s) as discussed above, with reference to FIGS. 2 and 3, respectively, in the current disclosure, it is not limited as such. In some examples, other estimation algorithms can be used instead of the causal forest algorithm(s) and/or the decision tree-based algorithm(s), or, in combination with the causal forest algorithm(s) and/or the decision tree-based algorithm(s). Any of one or more estimation algorithms of any type may be utilized to identify results of communications (e.g., impacts of messages), and/or to determine how to send subsequent communications, according to any of the techniques as discussed herein.

Figure 4:
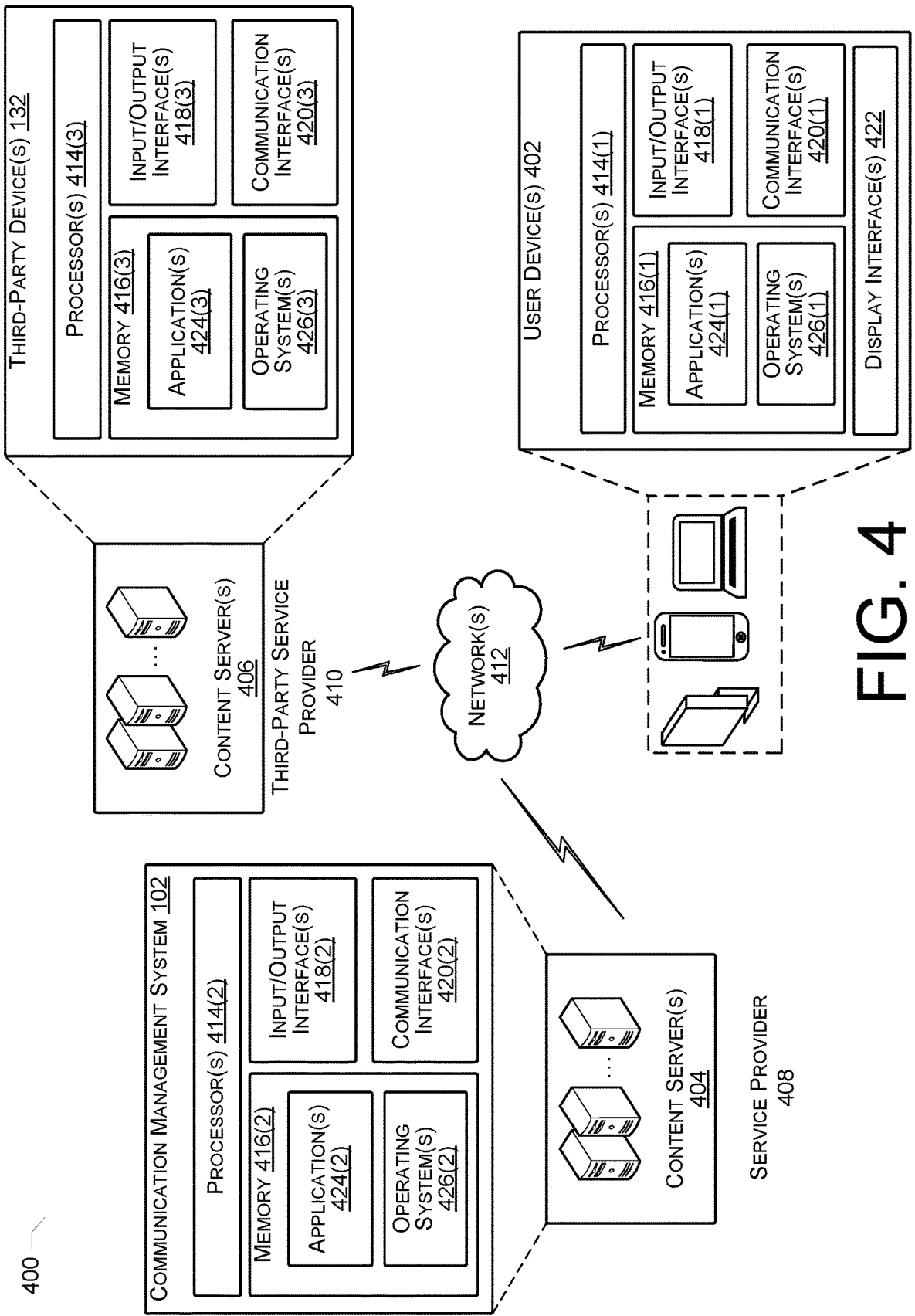
FIG. 4 is an example system that includes multiple devices for performing personalized communications management, in accordance with at least one embodiment.

FIG. 4 is an example system 400 that includes multiple devices for performing personalized communications management, in accordance with at least one embodiment.

The user device(s) 402 may include one or more of the devices (e.g., the user device(s) 104, the messaging device(s) 106, and/or the messaging system(s) 108, etc.), as discussed throughout this disclosure. Individual ones of the user device(s) 402 may utilized to implement any functions of the remote devices, as discussed throughout this disclosure. The content server(s) 404 may be associated with a communications provider 408. The content server(s) 404 may be included in, and utilized to implement any functions of, the communications management system 102 shown in FIG. 1. The content server(s) 404 may be associated with a communications 408. The third-party content server(s) 406 may be associated with a third-party service provider 410. The third-party content server(s) 406 may be included in, and utilized to implement any functions of, a third-party system including third-party device(s) (e.g., a system associated with a third-party service provider).

The user device(s) 402, the content server(s) 404, and the third-party content server(s) 406 may be configured to communicate with one another via one or more networks 412. The user device(s) 402 may communicate with the content server(s) 404 and the third-party content server(s) 406, such as to transmit requests to, and receive responses from, the content server(s) 404 and the third-party content server(s) 406. The user device(s) 402 may transmit any information associated with the requests to, and receive any information associated with the responses from, the content server(s) 404 and the third-party content server(s) 406. The user device(s) 402 may communicate between one another utilizing the network(s) 412. The content server(s) 404 may transmit any information associated with the requests to, and receive any information associated with the responses from, the third-party content server(s) 406. The third-party content server(s) 406 may transmit any information associated with the requests to, and receive any information associated with the responses from, the content server(s) 404.

The network(s) 412 may include the Internet, cable networks, cellular networks, wireless networks (e.g., Wi-Fi) and/or wired networks, as well as close-range communications such as Bluetooth®, Bluetooth® low energy, or the like. The user device(s) 402, the content server(s) 404, and/or the third-party content server(s) 406 may communicate among one another utilizing the same type, or different types, of networks (e.g., networks with different protocols). The network(s) 412 may include the Internet, cable networks, cellular networks, wireless networks (e.g., Wi-Fi) and/or wired networks, as well as close-range communications such as Bluetooth®, Bluetooth® low energy, or the like).

The user device(s) 402 may represent, but are not limited to, televisions (TVs), cellular telephones, desktop computers, server computers or blade servers such as web-servers, map-reduce servers, or other computation engines or network-attached storage units, personal computers, mobile computers, laptop computers, tablet computers, telecommunication devices, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, voice-enabled device(s), or any other sort of computing device coverable of sending communications and performing the functions according to the techniques described herein. Among these TVs are liquid crystal display (LCD) TVs, light emitting diode (LED) TVs, organic light emitting diode (OLED) TVs, plasma display devices (PDP) TVs, quantum dot (QLED) TVs, and electroluminescent (ELD) TVs. In some examples, the voice-enabled device(s) of the user device(s) 402 may include devices with or without display components. In some examples, the display device(s) of the user device(s) 402 may include devices with or without speech processing components.

In the illustrated example, the user device(s) 402, the content server(s) 404, and/or the third-party content server(s) 406 include one or more processors 414(1), 414(2), and/or 414(3) (collectively processor(s) 414), at least one memory 416(1), 416(2), and/or 416(3) (collectively memory 416), one or more input/output (I/O) interfaces 418(1), 418(2), and/or 418(3) (collectively I/O interface(s) 418), and/or one or more communication (e.g., network) interfaces 420(1), 420(2), and/or 420(3) (collectively communication interface(s) 420). The user device(s) 402 may include one or more display interfaces 422. In some examples, one or more of the voice-controlled device(s) among the user device(s) 402 are controlled only by voice and do not include any display interface.

Each processor 414 may include multiple processors and/or a processor having multiple cores. Further, the processor(s) 414 may include one or more cores of different types. For example, the processor(s) 414 may include application processor units, graphic processing units, and so forth. In various examples, the processor(s) 414 may include one or more microprocessors, microcomputers, microcontrollers, digital signal processors, central processing units, state machines, logic circuitries, and/or any devices that manipulate signals based on operational instructions. In some examples, the processor(s) 414 may include one or more hardware processors and/or logic circuits of any suitable type specifically programmed or configured to execute the algorithms and processes described herein.

For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 414 may possess its own local memory, which also may store program components, program data, and/or one or more operating systems.

In some examples, the processor(s) 414 may be configured to fetch and execute computer-readable processor-executable instructions stored in the memory 416. Depending on the configuration of user device(s) 402, the content server(s) 404, and the third-party content server(s) 406, the memory 416 may be an example of tangible non-transitory computer storage media and may include volatile and non-volatile memory and/or removable and non-removable media implemented in any type of technology for storage of information such as computer-readable processor-executable instructions, data structures, program modules or other data. Such memory 416 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which may be used to store the desired information and which may be accessed by a computing device. The memory 416 may be implemented as computer-readable storage media ("CRSM"), which may be any available physical media accessible by the processor(s) 414 to execute instructions stored on the memory 416. In some examples, CRSM may include random access memory ("RAM") and Flash memory. In other examples, CRSM may include, but is not limited to, read-only memory ("ROM"), electrically erasable programmable read-only memory ("EEPROM"), or any other tangible medium which may be used to store the desired information, and which may be accessed by the processor(s) 414.

The memory 416 may be used to store and maintain any number of functional components that are executable by the processor 414. In some examples, these functional components include instructions or programs that are executable by the processor 414 and that, when executed, implement operational logic for performing the actions and services attributed above to the user device(s) 402, the content server(s) 404, and the third-party content server(s) 406. Functional components of the user device(s) 402, the content server(s) 404, and the third-party content server(s) 406 stored in the memory 416(1), 416(2), and/or 416(3) may include applications 424(1), 424(2), and/or 424(3) (collectively applications 424). The application(s) 424 may configure the respective devices to perform functions described herein such as with regard to FIGS. 1-3 and 4.

The functional components of the user device(s) 402, the content server(s) 404, and the third-party content server(s) 406 stored in the memory 416(1), 416(2), and/or 416(3) may additionally include operating systems 426(1), 426(2), and/or 426(3), respectively (collectively operating systems 426). The operating system(s) 426 for controlling and managing various functions of the user device(s) 402, the content server(s) 404, and the third-party content server(s) 406. The memory 416 may also store other modules and data, which may include programs, drivers, etc., and the data used or generated by the functional components, to enable efficient and effective food order processing. Further, the user device(s) 402, the content server(s) 404, and the third-party content server(s) 406 may include many other logical, programmatic and physical components, of which those described are merely examples that are related to the discussion herein. In addition, the memory 416 may also store data, data structures and the like, that are used by the functional components.

The I/O interface(s) 418, may include scanners (e.g., for scanning bar codes, QR codes, etc.), speakers, a microphone, a camera, and various user controls (e.g., buttons, a joystick, a keyboard, a keypad, etc.), a haptic output device, and so forth. The communication interface(s) 420 may include one or more interfaces and hardware components for enabling communication with various other devices over the network or directly.

Figure 5:
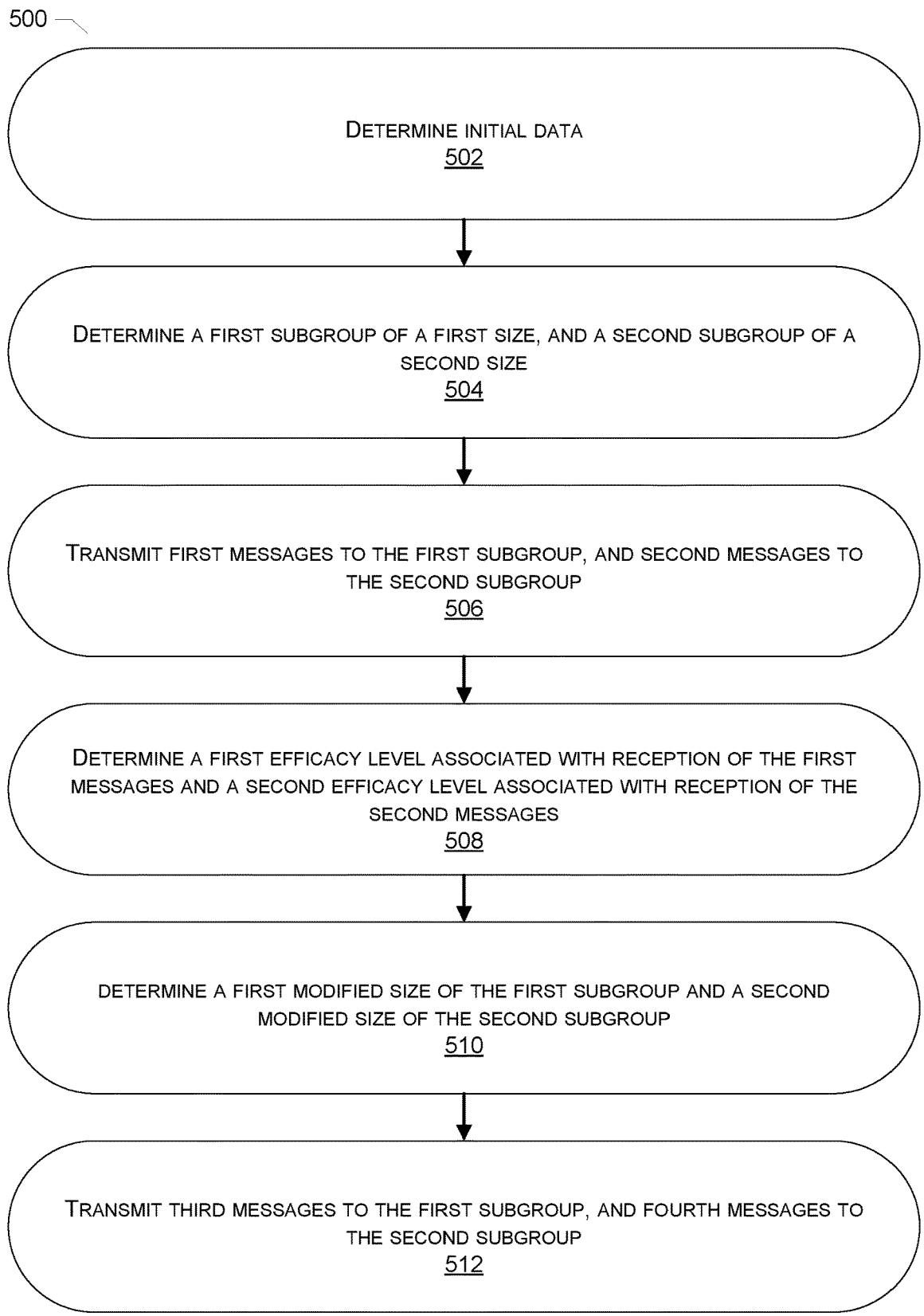
FIG. 5 is a flow diagram of an illustrative process for performing personalized communications management.

FIG. 5 is a flow diagram of an illustrative process 500 for performing personalized communications management.

At 502, the process 500 can include determining initial data. The initial data can include various types of data (e.g., static features), such as communication data (e.g., communications priorities and/or characteristics), device data (e.g., device priorities and/or characteristics), communications management system data (e.g., system priorities and/or characteristics), operational characteristics (e.g., operational characteristics of devices, systems, and/or networks), service provider data (e.g., service provider priorities, characteristics, and/or preferences), and/or recipient data (e.g., recipient priorities, characteristics, and/or preferences).

At 504, the process 500 can include determining a first subgroup of a first size, and a second subgroup of a second size. The first subgroup can be a treatment group. The second subgroup can be a control group. The treatment group can be utilized to determine a first efficacy level. The control group can be utilized to determine a second efficacy level as a baseline for comparison with the first efficacy level.

At 506, the process 500 can include transmitting first messages to the first subgroup, and second messages to the second subgroup. The first subgroup can be the treatment group of a first size, and the second subgroup can be the control group of a second size. The first and second messages can be utilized to modify sizes of the treatment and control groups.

At 508, the process 500 can include determining a first efficacy level associated with reception of the first messages and a second efficacy level associated with reception of the second messages. The first and second efficacy levels can be utilized to identify how effective the first and second messages, respectively, are, in achieving desired outcomes associated with the treatment and control groups. That is, the first/second efficacy levels may represent an effectiveness in which communications that are sent to first/second subgroups are in fact received, viewed, replied to, etc.

At 510, the process 500 can include determining a first modified size of the first subgroup and a second modified size of the second subgroup. The first and second modified sizes can be established after a certain amount of time passes from transmission of the first and second messages, based on results of the first and second messages. The results can be identified by comparing results associated with information in the messages, based on whether the messages were received.

At 512, the process 500 can include transmitting third messages to the first subgroup, and fourth messages to the second subgroup. The third and fourth messages can be transmitted based on the first modified size and the second modified size, respectively.

Although the term "user" is utilized throughout this disclosure, it is not limited as such and the term "user" is utilized for simplicity. The term "user" as used throughout disclosure may denote any type of user, including a user, an administrator, etc.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A system comprising:
   at least one processor; and
   at least one non-transitory computer-readable storage medium having computer-executable instructions stored thereon which, when executed on the at least one processor, cause the system to perform operations comprising:
   identifying individualized data associated with a group of employees, the individualized data including static features associated with employee characteristics and dynamic features associated with past employee communications;
   identifying a first subgroup of a first size including first employees of the group of employees as a treatment group, the treatment group being associated with treatment group communication effectiveness levels;
   identifying a second subgroup of a second size including second employees of the group of employees as a control group, based on an experiment ratio of the first size to the second size, the control group being associated with control group communication effectiveness levels utilized as a baseline for the treatment group communication effectiveness levels;
   transmitting first messages to the treatment group, and second messages to the control group;
   identifying, via an estimation algorithm, the treatment group communication effectiveness levels indicating first success rates of whether the first messages are received by the first employees;
   identifying, via the estimation algorithm, the control group communication effectiveness levels indicating second success rates of whether the second messages are received by the second employees;
   generating a modified experiment ratio by modifying the experiment ratio based on the treatment group communication effectiveness levels and the control group communication effectiveness levels, the modified experiment ratio indicating a modified first size of the treatment group and a modified second size of the control group; and
   transmitting third messages to the treatment group, and fourth messages to the control group based on the modified experiment ratio.

2. The system of claim 1, the operations further comprising:
   identifying a first efficacy level associated with the treatment group based on the treatment group communication effectiveness levels, and
   identifying a second efficacy level associated with the control group based on the control group communication effectiveness levels,
   wherein the modified second size is greater than the modified first size based on the second efficacy level being greater than the first efficacy level.

3. The system of claim 1, wherein the modified first size is greater than the modified second size based on determining that a first efficacy level associated with the treatment group communication effectiveness levels is greater than a second efficacy level associated with the control group communication effectiveness levels.

4. The system of claim 1, wherein the treatment group communication effectiveness levels are first treatment group communication effectiveness levels, the control group communication effectiveness levels are first control group communication effectiveness levels, and the modified experiment ratio is a first modified experiment ratio,
   the operations further comprising:
   generating a second modified experiment ratio of a third size of the treatment group to a fourth size of the control group, based on second treatment group communication effectiveness levels of the third messages, and second control group communication effectiveness levels of the fourth messages,
   wherein the second size is less than the fourth size based on the first control group communication effectiveness levels being less than the second control group communication effectiveness levels.

5. The system of claim 1, the operations further comprising:
   identifying a first priority level of first candidate messages, the first priority level being associated with a first employee utility level and a first business utility level;
   identifying a second priority level of second candidate messages, the second priority level being associated with a second employee utility level and a second business utility level,
   wherein the first candidate messages are transmitted as the first messages based on the first priority level being greater than the second priority level.

6. A system comprising:

at least one processor; and at least one non-transitory computer-readable storage medium having computer-executable instructions stored thereon which, when executed by the at least one processor, cause the system to perform operations comprising:

determining initial data associated with a group of individuals;

determining a first subgroup of a first size including first individuals of the group of individuals, and a second subgroup of a second size including second individuals of the group of individuals;

transmitting first messages to the first subgroup, and second messages to the second subgroup;

determining a first efficacy level associated with reception of the first messages by the first subgroup and a second efficacy level associated with reception of the second messages by the second subgroup;

determining a first modified size of the first subgroup and a second modified size of the second subgroup; and transmitting third messages to the first subgroup, and fourth messages to the second subgroup based at least in part on the first modified size and the second modified size.

7. The system of claim 6, wherein the initial data includes static features associated with individual characteristics, and dynamic features associated with past communications.

8. The system of claim 6, wherein:

identifying the first subgroup and the second subgroup further comprises identifying the first subgroup as a treatment group, and the second subgroup as a control group; and the control group is utilized to determine the second efficacy level as a baseline for comparison with the first efficacy level.

9. The system of claim 6, wherein:

determining the first subgroup and the second subgroup is based at least in part on an experiment ratio indicating the first size of the first subgroup and the second size of the second subgroup;

determining the first modified size and the second modified size further comprises generating a modified experiment ratio by modifying the experiment ratio based at least in part on the first efficacy level and the second efficacy level; and transmitting the third messages further comprises transmitting the third messages based at least in part on the modified experiment ratio.

10. The system of claim 6, wherein:

determining the first efficacy level associated with the first subgroup is based at least in part on first levels of reception of the first messages by the first individuals, and determining the second efficacy level associated with the second subgroup is based at least in part on second levels of reception of the second messages by the second individuals.

11. The system of claim 6, wherein:

determining the first efficacy level associated with the first subgroup is based at least in part on first levels of reception of the first messages by the first individuals; and determining the first modified size and the second modified size further comprises increasing the first size of the first subgroup relative to the second size of the second subgroup, based at least in part on the first levels of reception being greater than or equal to a threshold level.

12. The system of claim 6, the operations further comprising:

determining a first priority level of first candidate messages, the first priority level being associated with a first individual utility level and a first business utility level; and determining a second priority level of second candidate messages, the second priority level being associated with a second individual utility level and a second business utility level, wherein the first candidate messages are transmitted as the first messages based at least in part on the first priority level being greater than or equal to the second priority level.

13. The system of claim 6, the operations further comprising:

determining a first priority level of first candidate messages, the first priority level being associated with a first business value level, the first business value level indicating a first predicted level of a first change of revenue; and determining a second priority level of second candidate messages, the second priority level being associated with a second business value level, the second business value level indicating a second predicted level of a second change of revenue, wherein the first candidate messages are transmitted as the first messages based at least in part on the first business value level being greater than or equal to the second business value level.

14. A method comprising:

determining initial data associated with a group of individuals;

determining a treatment group including a first subgroup of the group of individuals, a control group including a second subgroup of the group of individuals, based at least in part on the initial data, a first size of the first subgroup including first individuals, and a second size of the second subgroup including second individuals;

transmitting first messages to the first subgroup of the treatment group, and second messages to the second subgroup of the control group;

determining a first efficacy level associated with reception of the first messages by the first subgroup of the treatment group and a second efficacy level associated with reception of the second messages by the second subgroup of the control group;

determining a first modified size of the first subgroup of the treatment group, and a second modified size of the second subgroup of the control group; and transmitting third messages to the first subgroup of the treatment group, and fourth messages to the second subgroup of the control group based at least in part on first modified size and the second modified size.

15. The method of claim 14, wherein:

the initial data includes first results data associated with the first subgroup, and second results data associated with the second subgroup;

preliminary messages are transmitted to the first subgroup, but not the second subgroup, based at least in part on first preferences data received from the first subgroup, and second preferences data received from the second subgroup;

the first preferences data indicates authorization of transmission of the preliminary messages;

the second preferences data indicates lack of authorization of transmission of the preliminary messages; and the first results data and the second results data are collected after transmission of the preliminary messages.

16. The method of claim 14, wherein:

the initial data includes preliminary data associated with a second group of individuals;

the preliminary data includes first results data associated with first preliminary messages sent to a third subgroup of the second group of individuals, and second results data associated with second preliminary messages sent to a fourth subgroup of the second group of individuals;

the first results data is associated with first response data of the third subgroup based on the first preliminary messages; and the second results data is associated with second response data of the fourth subgroup with respect to the second preliminary messages.

17. The method of claim 14, wherein:

the first efficacy level is based at least in part on individual treatment group communication effectiveness levels associated with corresponding first individuals of the treatment group; and the second efficacy level is based at least in part on individual control group communication effectiveness levels associated with corresponding second individuals of the control group.

18. The method of claim 14, wherein a first ratio utilized to modify sizes of the treatment group and the control group is associated with the second size of the control group, further comprising:

determining a third efficacy level associated with reception of fifth messages by the control group;

determining a second ratio utilized to additionally modify the sizes of the treatment group and the control group, wherein the second ratio is associated with a third size of the control group, and the third size is greater than the second size based at least in part on the third efficacy level being greater than the second efficacy level.

19. The method of claim 14, wherein determining a ratio utilized to modify sizes of the treatment group and the control group further comprises increasing the first size of the treatment group relative to the second size of the control group, based at least in part on the first efficacy level being greater than the second efficacy level.

20. The method of claim 14, further comprising:

determining a first priority level of first candidate messages, the first priority level being associated with a first individual utility level and a first business utility level; and determining a second priority level of second candidate messages, the second priority level being associated with a second individual utility level and a second business utility level, wherein the first candidate messages are transmitted as the first messages based at least in part on the first priority level being greater than or equal to the second priority level.

\* \* \* \* \*